United States Patent
Zhou et al.

(10) Patent No.: US 8,351,305 B2
(45) Date of Patent: Jan. 8, 2013

(54) NOTCHED POLE DESIGN FOR HAMR RECORDING

(75) Inventors: Hua Zhou, Pittsburgh, PA (US); Jie Zou, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 688 days.

(21) Appl. No.: 12/489,246

(22) Filed: Jun. 22, 2009

(65) Prior Publication Data

US 2010/0321815 A1 Dec. 23, 2010

(51) Int. Cl.
*G11B 11/00* (2006.01)
(52) U.S. Cl. .................. 369/13.33; 369/112.27
(58) Field of Classification Search ........... 369/13.01, 369/13.32, 13.33, 112.27, 13.14, 13.17, 13.02, 369/13.03; 360/236.6, 235.8, 125.15, 125.03, 360/119.02, 110, 125.21, 119.04
See application file for complete search history.

(56) References Cited

U.S. PATENT DOCUMENTS

| | | | |
|---|---|---|---|
| 5,625,512 A * | 4/1997 | Smith | 360/236.6 |
| 5,793,568 A * | 8/1998 | Smith | 360/236.6 |
| 5,978,187 A | 11/1999 | Shouji et al. | |
| 6,010,753 A | 1/2000 | Shouji et al. | |
| 7,298,587 B2 | 11/2007 | Pokhil et al. | |
| 7,412,143 B2 | 8/2008 | Rottmayer et al. | |
| 7,511,921 B2 * | 3/2009 | Mallary et al. | 360/123.37 |
| 7,576,951 B2 * | 8/2009 | Allen et al. | 360/125.13 |
| 7,978,430 B2 * | 7/2011 | Le et al. | 360/125.1 |
| 7,990,652 B2 * | 8/2011 | Hsiao et al. | 360/125.03 |
| 8,031,561 B2 * | 10/2011 | Hellwig et al. | 369/13.01 |
| 8,111,479 B2 * | 2/2012 | Chen et al. | 360/125.21 |
| 2007/0258167 A1 | 11/2007 | Allen et al. | |
| 2009/0073858 A1 | 3/2009 | Seigler et al. | |
| 2010/0321825 A1 * | 12/2010 | Nazarov | 360/125.02 |
| 2011/0310511 A1 * | 12/2011 | Edelman et al. | 360/123.37 |

OTHER PUBLICATIONS

P.A.A. van der Heijden et al., "Effects of Transition Curvature on Perpendicular Magnetic Recording Performance," from Applied Physics Letters, vol. 83, No. 21 (Nov. 24, 2003) pp. 4369-4371.
S. Greaves et al., "The Effect of Write Head Structures on Written Transitions in Perpendicular Media", from IEEE Transactions on Magnetics, vol. 41, No. 10 (Oct. 2005) pp. 3058-3060.

* cited by examiner

*Primary Examiner* — Ali Neyzari
(74) *Attorney, Agent, or Firm* — Hollingsworth Davis, LLC

(57) ABSTRACT

A magnetic writer comprises a write pole and a near field transducer. The write pole has a leading edge, a trailing edge and a notch at the leading edge of the write pole. The near field transducer produces near field radiation. The near field transducer positioned in front of or at least partially within the notch.

20 Claims, 11 Drawing Sheets

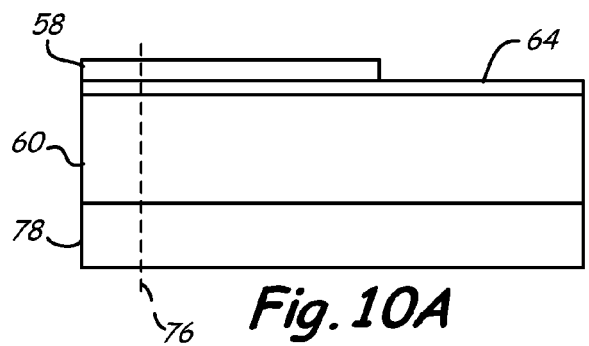
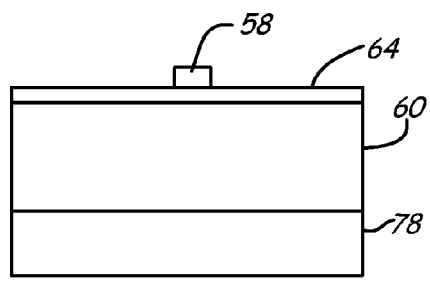
Fig. 10A        Fig. 10B
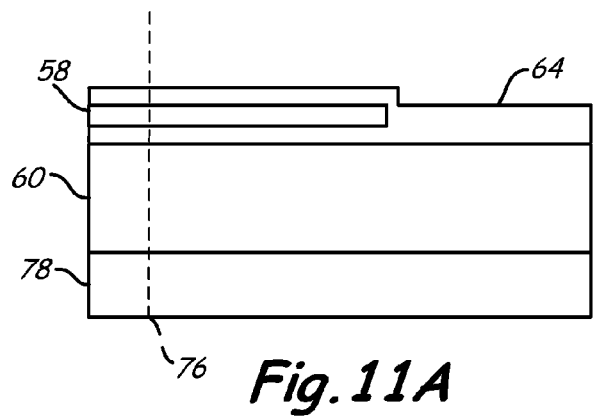
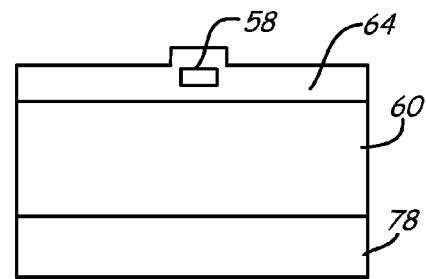
Fig. 11A        Fig. 11B
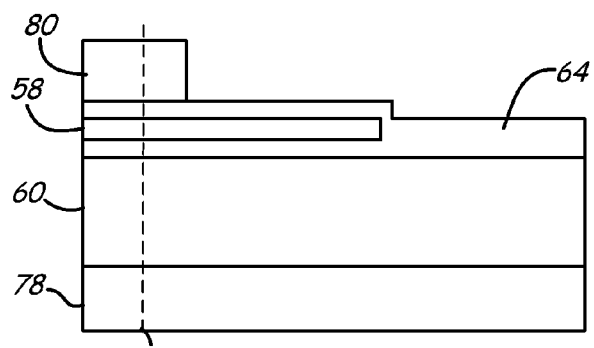
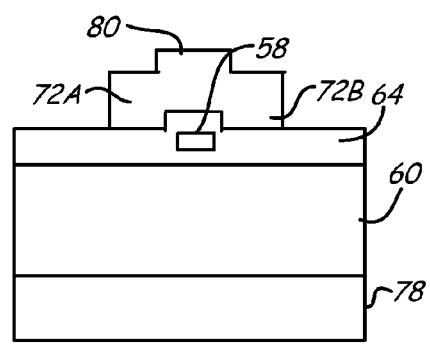
Fig. 12A        Fig. 12B

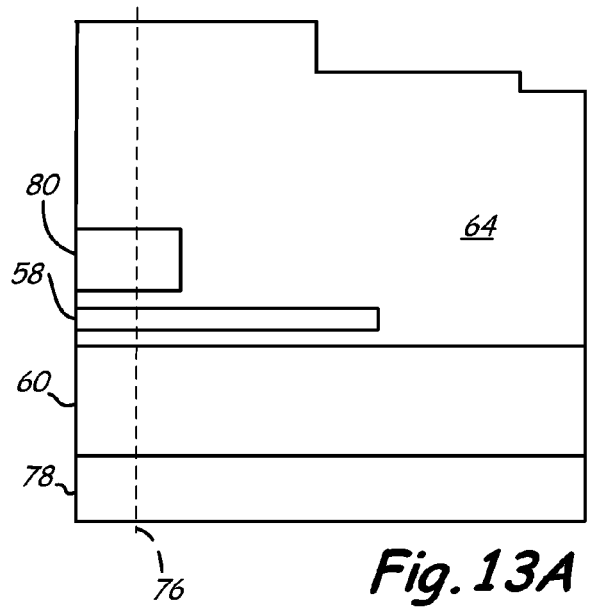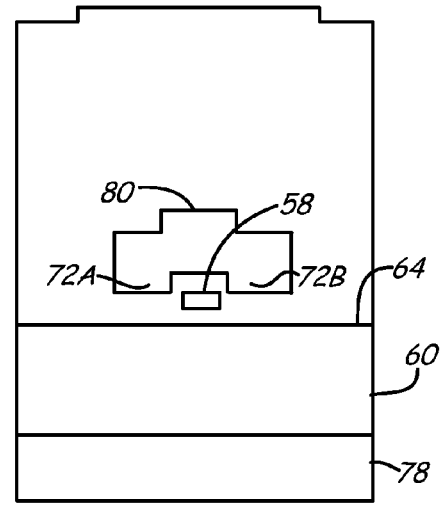
Fig. 13A   Fig. 13B
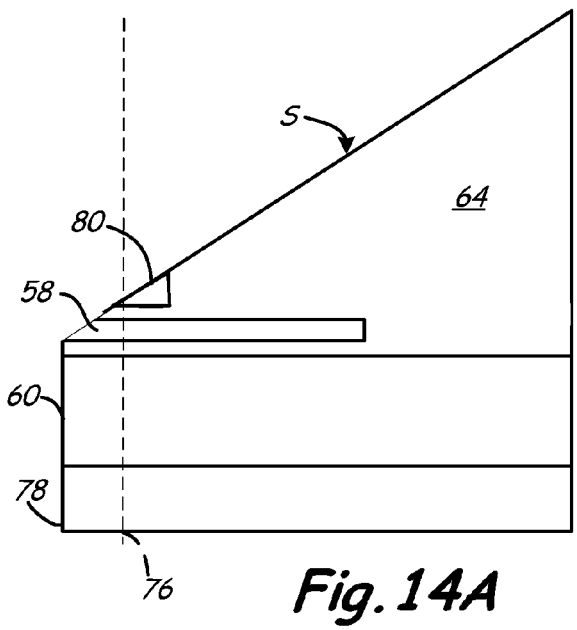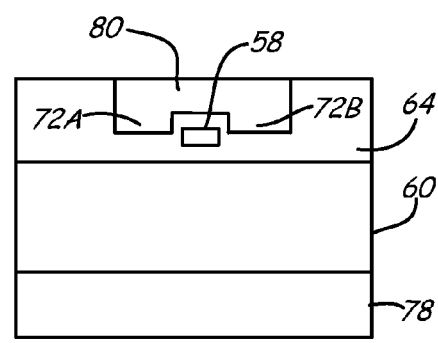
Fig. 14A   Fig. 14B

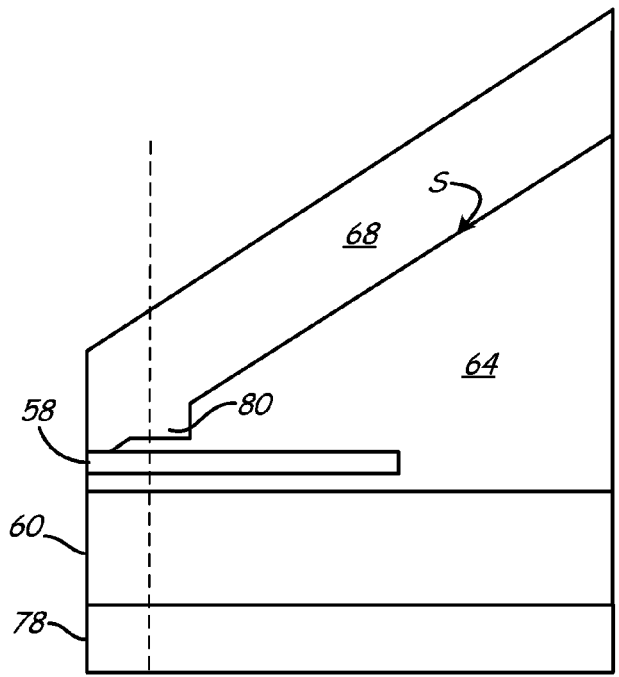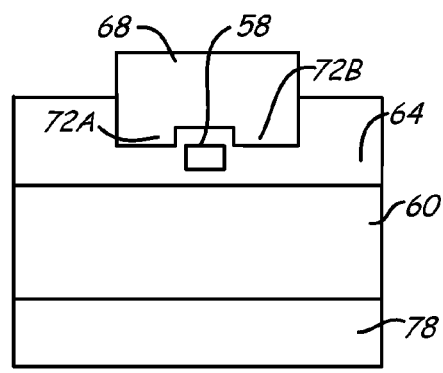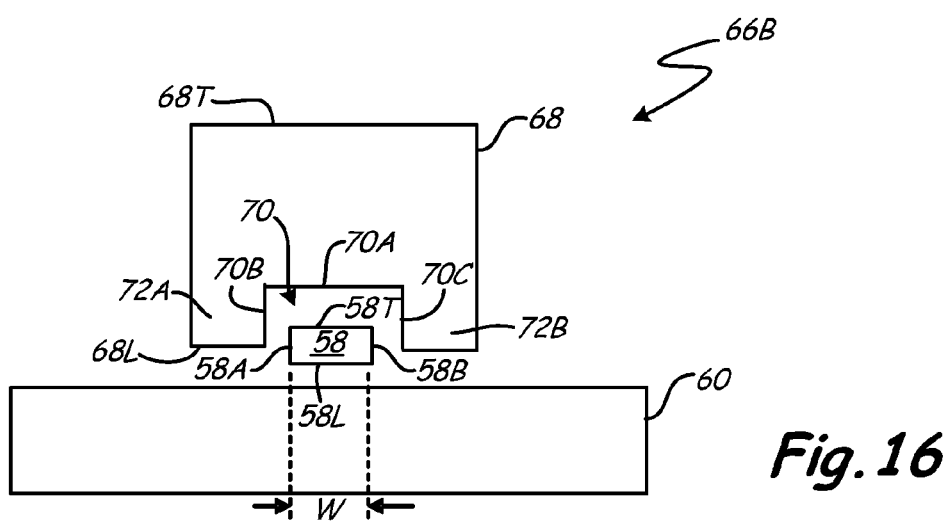

NOTCHED POLE DESIGN FOR HAMR RECORDING

BACKGROUND

In response to increased demand for higher magnetic storage capacity, areal bit densities approaching or greater than 1 Tb/in$^2$ are being contemplated. The bit size of sub 50 nm required to fulfill this goal is within a range where superparamagnetic instabilities affect the lifetime of stored data. Superparamagnetic instabilities become an issue as the grain volume of the recording media is reduced in order to increase the areal density of recorded information. The superparamagnetic effect is most evident when the grain volume V is sufficiently small such that the inequality $K_u V/k_B T > 70$ can no longer be maintained, where $K_u$ is the magnetocrystalline anisotropy energy density of the material, $k_B$ is Boltzmann's constant, and T is absolute temperature. When this inequality is not satisfied, thermal energy can demagnetize the stored bits. As the grain size is decreased in order to increase the areal density, a threshold is reached for a given $K_u$ and temperature T such that stable data storage is no longer feasible.

The thermal stability can be improved by employing a recording media formed of a material with a very high $K_u$. However, with available materials, recording heads are not able to provide a sufficient or high enough magnetic writing field to write on such a media. Accordingly, it has been proposed to overcome the recording head field limitations by employing thermal energy to heat a local area on the recording media before or at about the time of applying the magnetic field to write to the media in order to assist in the recording process.

Heat assisted magnetic recording (HAMR) generally refers to the concept of locally heating a recording media to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information.

For heat assisted magnetic recording, an electromagnetic wave of, for example, visible, infrared, or ultraviolet light can be directed onto a surface of a data storage media to raise the temperature of a localized area to facilitate switching. Well known optical waveguides such as solid immersion lenses (SILs), solid immersion mirrors (SIMs), and mode index lenses have been proposed for use in reducing the size of a spot on the media that is subjected to the electromagnetic radiation. Due to diffraction limited optical effects, SILs, SIMs, and mode index lenses alone are not sufficient to achieve focal spot sizes necessary for high areal density recording. Metal pins and other near field transducer (NFT) designs are positioned at the focal point of the waveguide and used to further concentrate the energy and direct it to a small spot on the surface of the recording media.

One of the problems in achieving high areal density with HAMR is magnetic transition curvature. A magnetic transition is formed on the magnetic media between two adjacent portions of the magnetic media that have different polarities. Transition curvature is the variation in the location of the magnetic transition as a function of the cross-track position. In HAMR, especially when media coercivity is high, the interaction between the magnetic field profile of the write pole and the thermal profile of the NFT results in a forward-curved transition. The curvature of the magnetic transition or the transition curvature decreases the areal density of the recording media. Further, the reader, which reads the information written, and its shields are flat. Reading a curved transition with a flat reader produces extra noise and reduces the signal-to-noise ratio (SNR) and the bit error rate (BER).

SUMMARY

A magnetic writer comprises a write pole and a near field transducer. The write pole has a leading edge, a trailing edge and a notch at the leading edge of the write pole. The near field transducer produces near field radiation. The near field transducer positioned in front of or at least partially within the notch.

BRIEF DESCRIPTION OF THE DRAWINGS

FIGS. 10A-15B illustrate a process for forming the notched recording head of FIG. 7.

FIG. 16 is an end view of an alternative embodiment of a notched recording head for HAMR as viewed from a magnetic media.

DETAILED DESCRIPTION

Figure 1:
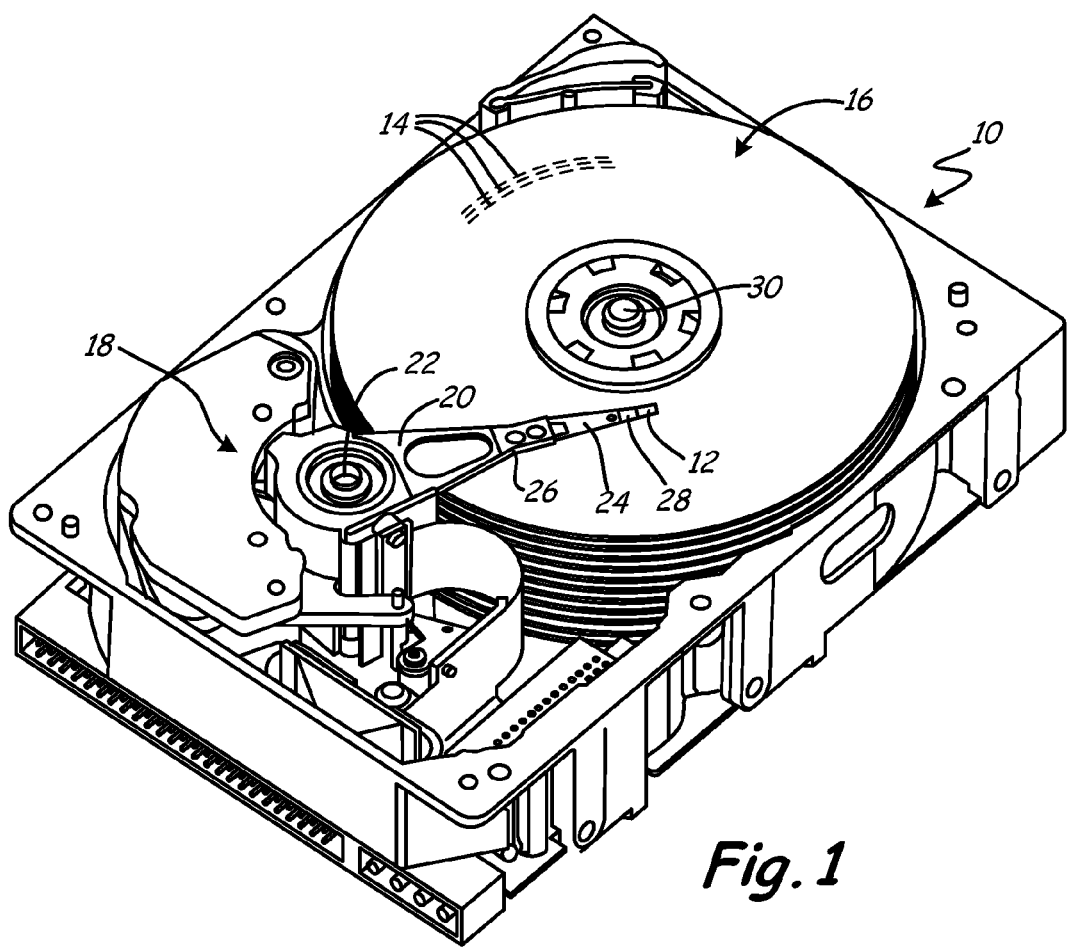
FIG. 1 is a perspective view of a disc drive.

FIG. 1 is a perspective view of disc drive 10 including an actuation system for positioning slider 12 over tracks 14 of magnetic media 16. The particular configuration of disc drive 10, including the configuration of magnetic media 16, is shown for ease of describing the present invention and is not intended to limit the scope of the present invention in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic media 16 rotates around axis 30, so that windage is encountered by slider 12 to keep it aloft a small distance above the surface of magnetic media 16. Each track 14 of magnetic media 16 is formatted with an array of data storage cells for storing data. Slider 12 carries a magnetic transducer (not shown in FIG. 1) for reading and/or writing data on tracks 14 of magnetic media 16. The magnetic transducer utilizes additional electromagnetic energy to heat the surface of media 16 to facilitate recording by a process termed heat assisted magnetic recording (HAMR).

Figure 2:
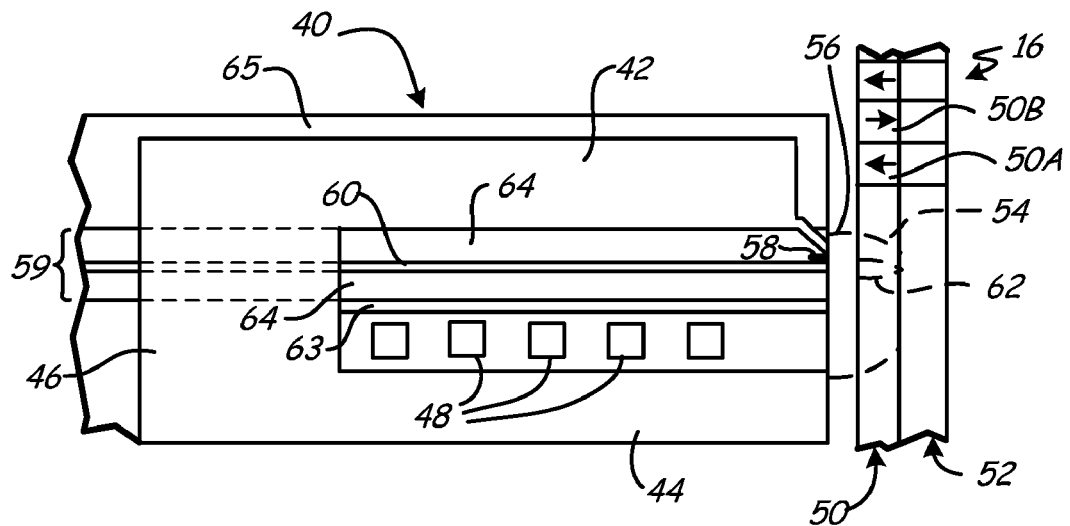
FIG. 2 is a cross-sectional view of a portion of a prior art recording head for heat assisted magnetic recording (HAMR).

A HAMR transducer includes a magnetic writer for generating a magnetic field to write to a magnetic media (e.g. magnetic media 16) and an optical device to heat a portion of the magnetic media proximate to the write field. FIG. 2 is a cross sectional view of a portion of prior art magnetic recording head 40 and a portion of associated perpendicular magnetic storage media 16. Magnetic recording head 40 includes sloped write pole 42 and return pole 44 coupled by pedestal 46. Coil 48 extends between write pole 42 and return pole 44, and wraps around pedestal 46. An insulating material separates the coil turns. Perpendicular magnetic storage media 16 comprises magnetically hard storage layer 50 and optional soft magnetic underlayer 52. A current through coil 48 induces a magnetic field in write pole 42, which is used to change the polarity of magnetically hard layer 50 in the vicinity of write pole 42. Magnetic flux travels perpendicularly from write pole 42 at air bearing surface (ABS) 56, across SUL 52, and through return pole 44 and pedestal 46 to provide a closed flux path. Reversing the direction of the current through coil 48 reverses the polarity of the data written to magnetically hard layer 50. For example positive portions 50A have a positive polarity and negative portions 50B have a negative polarity. Magnetic transitions (shown in FIG. 6) are located between positive portions 50A and negative portions 50B.

Near field transducer 58 is positioned adjacent to, but spaced apart from write pole 42, proximate air bearing surface 56. Waveguide 59 is positioned adjacent to near field transducer 58. Waveguide 59 includes waveguide core 60 and cladding or insulating material 64, which is positioned on either side of waveguide core 60. Near field transducer 58 is coupled to waveguide core 60 which receives an electromagnetic wave from an external source such as a laser. Mirror 63 is positioned adjacent to one of the layers of insulating material 64. In one example, mirror 63 couples light from a laser to waveguide 59 and increases the grating coupling efficiency. Insulating material 65 is positioned adjacent to write pole 42, opposite insulating material 64 to insulate write pole 42.

In HAMR, the coercivity of magnetic media 16 is too high for the magnetic field from write pole 42 to write to magnetic media 16. Electromagnetic radiation at the end of near field transducer 58 heats portion 62 of magnetic media 16 to lower the coercivity so that the magnetic field from write pole 42 can change the direction of polarity of storage media 16. Near field transducer 58 is electrically isolated from poles 42 and 44, for example, by an insulating layer 64. Insulating layer 64 can be formed of, for example, aluminum oxide ($Al_2O_3$).

HAMR transducers can incorporate various waveguides such as mode index lenses or planar solid immersion mirrors or lenses to generate focused beams. Electromagnetic waves travel along the longitudinal axis of waveguide core 60 and are deflected at a boundary towards a focal point. Near field transducer 58 is required to further focus the electromagnetic energy within waveguide core 60 to acceptable sub 100 nm spot sizes. Near field transducer 58 is positioned at the focal point of waveguide core 60 and couples with incident waves from waveguide core 60 to generate surface plasmons that propagate axially down NFT 58. The surface plasmons exit NFT 58 as evanescent energy that heats a small region 62 of recording media 16.

Arrow A indicated the direction of movement of magnetic storage media 16. Recording head 40 moves in a direction relatively opposite of magnetic storage media 16. For example, in use, write pole 42 trails NFT 58.

A recording head for HAMR having a notched write pole is described herein. The notched write pole produces a transition on magnetic media 16 having a reduced curvature. The lower transition curvature improves the SNR and the BER of the recording head. Alternatively, or additionally, the lower transition curvature increases areal density capabilities and enables more bits to be written in media 16.

Before discussing the notched write pole for a HAMR recording head, a prior art structure without a notched write pole (i.e. having a flat write pole) will be described in conjunction with FIGS. 3-6. In particular, the magnetic transition curvature produced by the prior art structure will be shown and discussed, so that the improvement achieved by the notched write pole can be appreciated.

Figure 3:
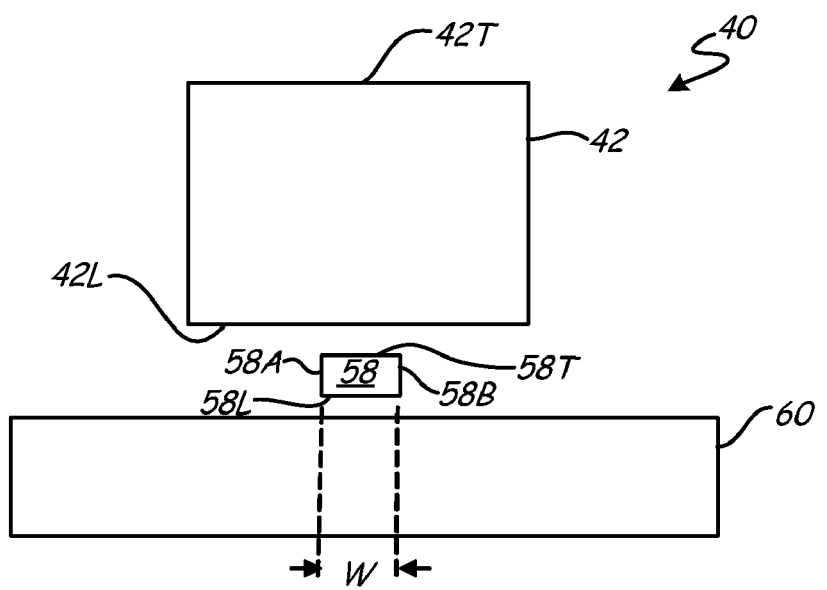
FIG. 3 is an end view of the prior art recording head for HAMR of FIG. 2 having a flat write pole as viewed from a magnetic media.

FIG. 3 is a view of prior art recording head 40 for HAMR from magnetic media 16. Recording head 40 includes write pole 42 (having leading edge 42L and trailing edge 42T), NFT 58 (having leading edge 58L, trailing edge 58T, first side 58A and second side 58B) and waveguide core 60. Near field transducer 58 is spaced apart from waveguide core 60, such as by an insulating material. In FIG. 3, leading edge 42L of write pole 42 is flat. Width W of NFT 58 is defined between first side 58A and second side 58B. Write pole 42 is wider than width W of NFT 58. Width W of NFT 58 determines the track width of the recorded tracks. In use, light travels down waveguide core 60, and is focused to an acceptable size spot on media 16 by NFT 58. The light heats magnetic media 16, reducing the coercivity so that write pole 42 can write to the spot. Width W of NFT 58 controls the track width by defining the width of media 16 which has a coercivity low enough so that write pole 42 can write to (or change the direction of polarity of) media 16.

Figure 4:
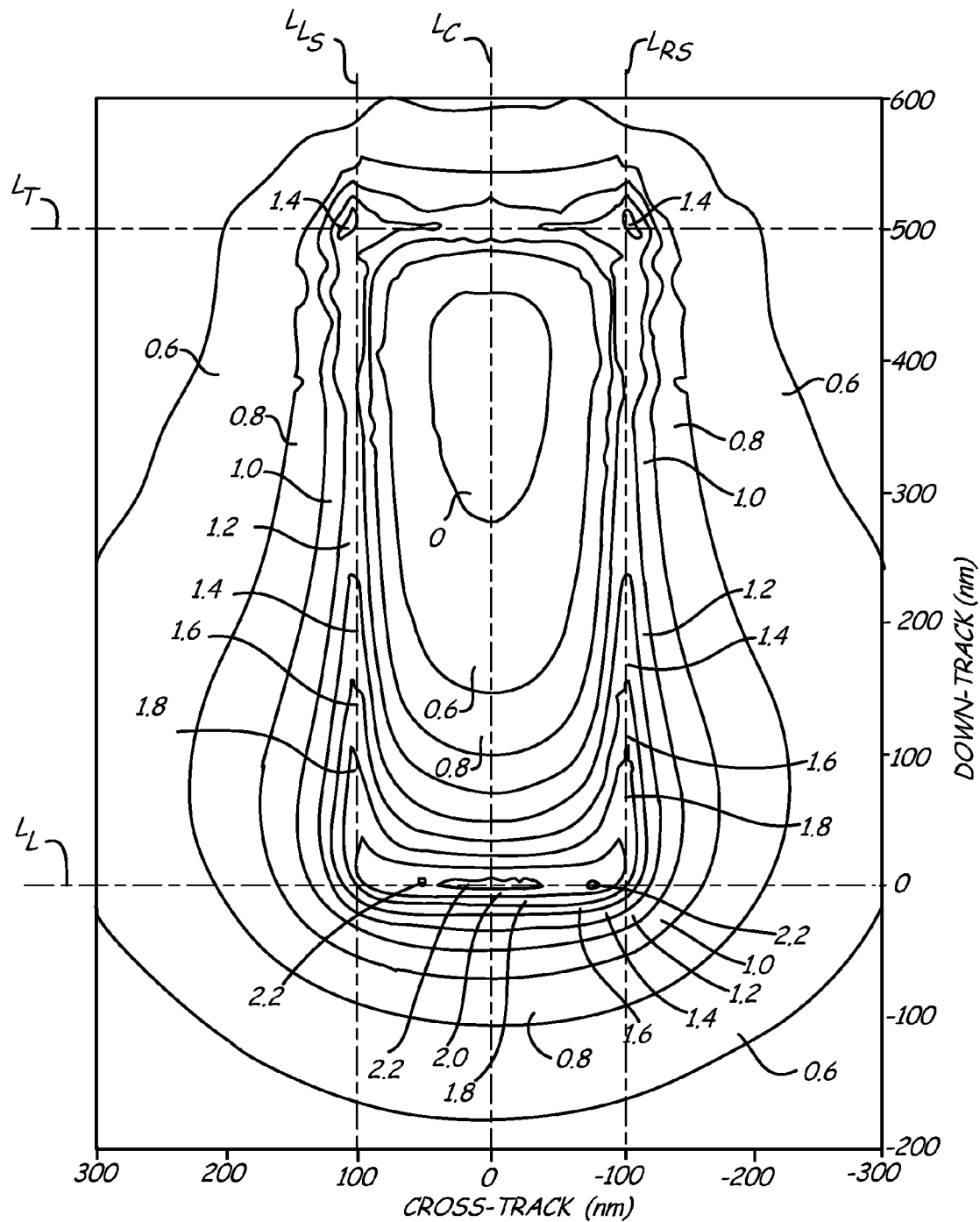
FIG. 4 illustrates the Stoner-Walfarth effective magnetic field profile for the recording head of FIG. 3 at about 60 milliamps electric current and a head-to-media spacing of about 7.5 nanometers.

As described above, recording head 40 is able to write to media 16 due to the magnetic field of write pole 42 and the heating from NFT 58. A simulated Stoner-Walfarth effective magnetic field profile of recording head 40 at about 60 milliamps electric current and a head-to-media spacing (HMS) of about 7.5 nanometers is shown in FIG. 4. The effective field was calculated from the perpendicular component and the longitudinal component of the write field, based on the Stoner-Walfarth angular dependent switching model. The X-axis is the cross-track position in nanometers, the Y-axis is the down-track position in nanometers and the magnetic field of each region is provided in Tesla. Leading edge 42L of write pole 42 is positioned approximately along line $L_L$ between line $L_{LS}$ and line $L_{RS}$. Trailing edge 42T of write pole 42 is located in the positive down-track direction from leading edge 42L approximately along line $L_T$ between line $L_{LS}$ and line $L_{RS}$, and NFT 58 (not shown in FIG. 4) is located in the negative down-track direction from leading edge 42L and line $L_L$. Centerline $L_C$ is the centerline of write pole 42. As shown, the Stoner-Walfarth effective magnetic field is about constant along line $L_L$ between line $L_{LS}$ and line $L_{RS}$ (approximately along leading edge 42L of write pole 42), and the Stoner-Walfarth effective magnetic field decays in the negative down-track position direction such that the Stoner-Walfarth effective magnetic field decreases with decreasing distance to NFT 58. Although the Stoner-Walfarth effective magnetic field is generally constant along line $L_L$ between line $L_{LS}$ and line $L_{RS}$, it decays along line $L_L$ in the positive cross-track direction from line $L_{LS}$ and in the negative cross-track direction from line $L_{RS}$. The intersection of line $L_{LS}$ with line $L_L$ and the intersection of line $L_{RS}$ with line $L_L$ represent the sides of leading edge 42L of write pole 42. Thus, the Stoner-Walfarth effective magnetic field decays in the cross-track direction with increasing distance from the sides of leading edge 42L.

Figure 5:
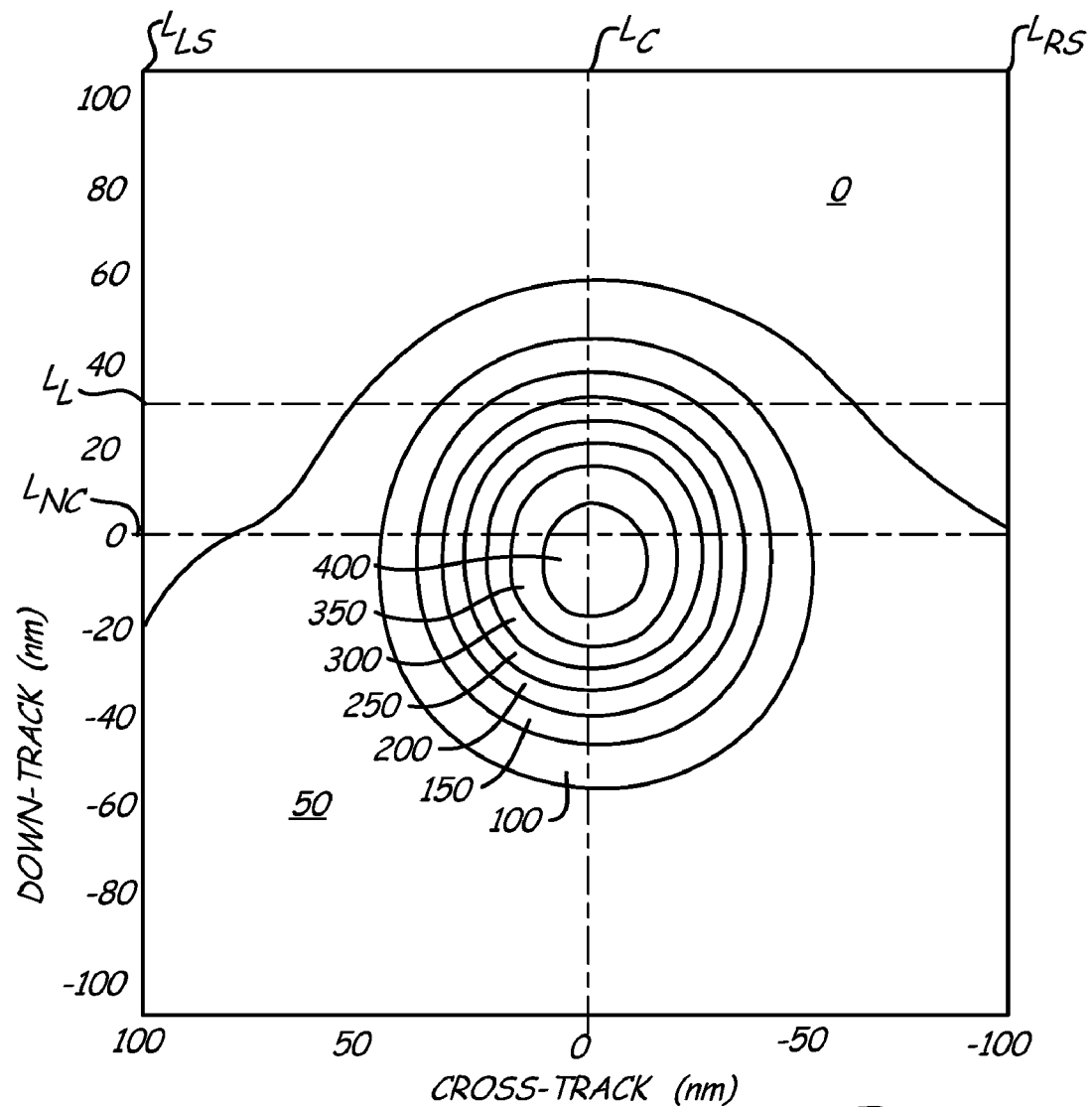
FIG. 5 illustrates the thermal profile for the recording head of FIG. 3 having a near field transducer with a pole width of about 30 nanometers.

A simulated thermal profile (the temperature increase from room temperature) produced of NFT 58 is shown in FIG. 5. As described above, NFT 58 produces a thermal profile on media 16, thus the profile of FIG. 5 will be discussed as a thermal profile produced by NFT 58 on media 16. NFT 58 of FIG. 5 has width W of about 30 nanometers. The X-axis in FIG. 5 is the cross-track position in nanometers, the Y-axis is the down-track position in nanometers, and the temperatures are labeled in degrees Celsius. Line $L_C$ is the cross-track centerline of NFT 58, and line $L_{NC}$ is the down-track centerline of NFT 58. The center of NFT 58 is located at the intersection of line $L_C$ and line $L_{NC}$. Leading edge 42L of write pole 42 is located in the positive down-track direction from the center of NFT 58, approximately along line $L_L$ between line $L_{LS}$ and line $L_{RS}$. As shown in FIG. 5, NFT 58 produces a circular or oval shaped thermal profile on media 16. The temperature of media 16 is highest at the center of NFT 58 and decays in the down-track direction such that the temperature decreases with decreasing distance to write pole 42 and line $L_L$. For example, the temperature of magnetic media 16 is higher at the center of NFT 58 than at the trailing edge of NFT 58. In the cross-track direction, the temperature of media 16 is highest along centerline $L_C$ and decreases with increasing distance from centerline $L_C$.

In use, write pole 42 is aligned with NFT 58 in the cross-track direction so that centerline $L_C$ of write pole 42 in FIG. 4 and centerline $L_C$ of NFT 58 in FIG. 5 are aligned. In recording head 40, as illustrated by FIG. 4 and FIG. 5, the field of write pole 42 is approximately constant along leading edge 42L while the temperature of magnetic media 16 is higher at the center of leading edge 42L than at the sides of leading edge 42L. Because of the temperature profile on media 16, the coercivity of media 16 is lower at the center of leading edge 42L than at the sides. Thus, in recording head 40, it becomes increasingly more difficult to write to magnetic media 16 with increasing distance in the cross-track direction from the center of leading edge 42L of write pole 42.

Figure 6:
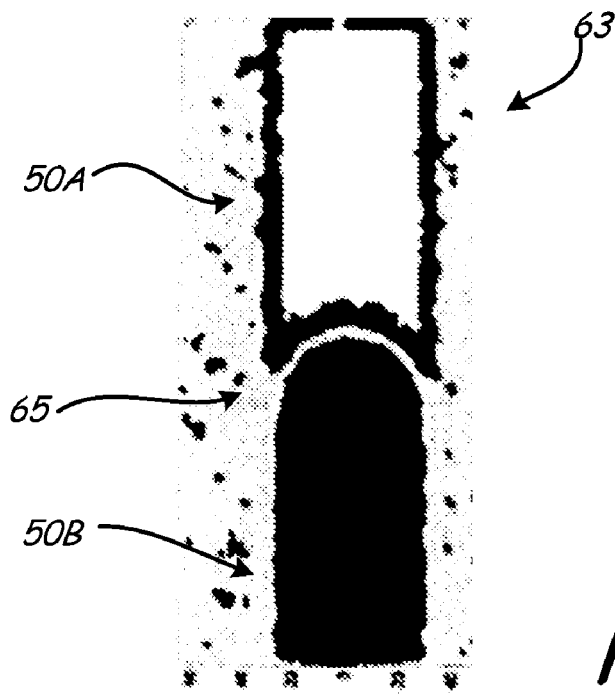
FIG. 6 is a simulated magnetization image illustrating a magnetic transition formed on a magnetic media by the recording head of FIG. 3.

FIG. 6 is a simulated magnetization image illustrating the magnetic transition curvature formed on magnetic media 16 by recording head 40. FIG. 6 shows bit 63 represented by a single magnetic transition. Bit 63 was written by recording head 40 having flat write pole 42 and with NFT 58 having width W of about 30 nm. Bit 63 includes positive portion 50A, negative portion 50B and magnetic transition 65, which is formed between positive portion 50A and negative portion 50B.

Magnetic transition 65 is a forward-curved transition having significant curvature. Magnetic transition 65 is affected by the thermal profile of NFT 58 and the magnetic field profile of flat write pole 42. The curvature of magnetic transition 65 is at least partially due to the lower coercivity of media 16 due to the higher temperature at the center of leading edge 42 compared to the sides. The significant forward transition curvature of magnetic transition 65 significantly degrades the signal-to-noise ratio (SNR) and the bit error rate (BER), especially at high linear densities. It also results in a wide erase band that limits track density.

Figure 7:
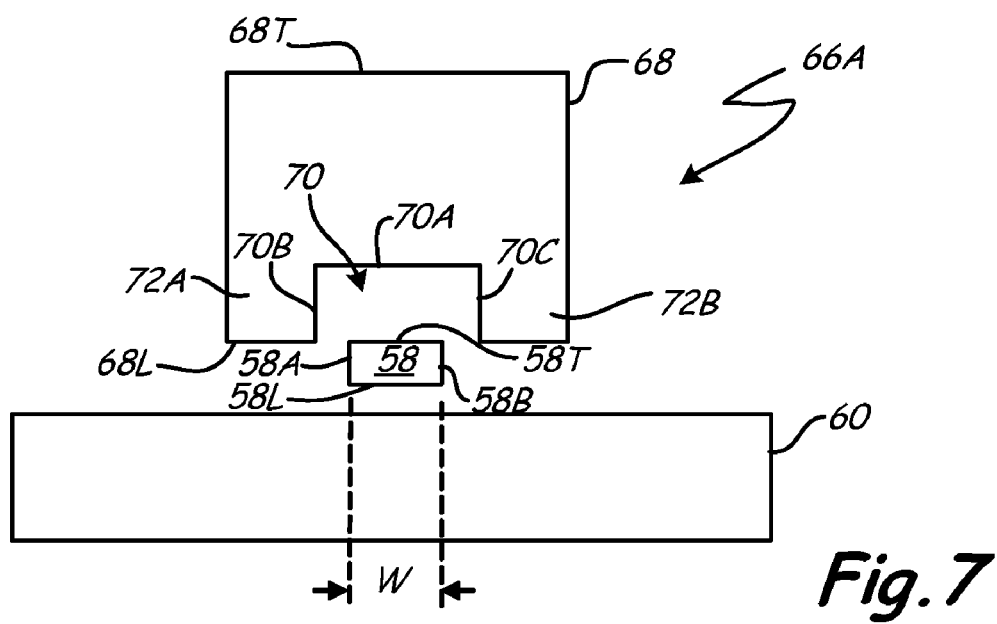
FIG. 7 is an end view of a notched recording head for HAMR having a notched write pole as viewed from a magnetic media.

FIG. 7 shows one embodiment of notched recording head 66A for HAMR as viewed from magnetic media 16, which produces transitions have less curvature compared to recording head 40 of FIG. 3. Write head 66A includes notched write pole 68, NFT 58 and waveguide core 60. NFT 58 and waveguide core 60 function as described above. NFT 58 can include a metallic pin or a sphere/pin or disc/pin combination. As shown in FIG. 7, NFT 58 is spaced apart from waveguide core 60. In an alternative embodiment, near field transducer 58 is immediately adjacent waveguide core 60 such that there is no space between near field transducer 58 and waveguide core 60. Width W of NFT 58 defines the width of the track and can be varied. In one example, NFT 58 can have width W between about 10 and 100 nm. In another example, NFT 58 can have width W between about 20 nm and 50 nm.

Notched write pole 68 includes indentation or notch 70 (formed by first notch side 70A, second notch side 70B and third notch side 70C), first write pole side 72A, second write pole side 72B, leading edge 68L and trailing edge 68T. NFT 58 includes leading edge 58L, trailing edge 58T, first side 58A and second side 58B. First notch side 70A is generally parallel to trailing edge 58T of NFT 58; second notch side 70B and third notch side 70C are generally perpendicular to trailing edge 58T of NFT 58. First write pole side 72A and second write pole side 72B extend from and define either side of notch 70. The width of notch 70 is defined in the cross-track direction between second notch side 70B and third notch side 70C. Notch 70 is at least as wide as NFT 58 so that the space between second side 70B and third side 70C is at least equal to width W of NFT 58.

Notched write pole 68 is spaced apart from NFT 58. First notch side 70A is spaced apart from trailing edge 58T in the down-track direction, and second and third notch sides 70A and 70B, respectively, are spaced apart from first and second sides 58A, 58B in the cross-track direction. In one example, aluminum oxide separates notched write pole 68 from NFT 58. However, other insulating material can be used between notched write pole 68 and NFT 58. Notched write pole 68 is insulated from NFT 58 to maintain the efficiency of NFT 58.

Notched write pole 68 is formed of a magnetic metal, such as alloy containing cobalt, iron and/or nickel. When placed too close to NFT 58, notched write pole 68 absorbs light from NFT 58. This reduces the efficiency of NFT 58 and more light is required to heat media 16. In one example, the edges of notched write pole 68 are less than about 100 nm, and more specifically are between about 100 nm and about 5 nm, between about 100 nm and about 30 nm, between about 50 nm and about 30 nm or between about 30 nm and about 10 nm, from the edges of NFT 58 in order to maintain the efficiency of NFT 58. In another example, trailing edge 58T of NFT 58 is less than about 100 nm, and more specifically is between about 100 nm and about 5 nm, between about 100 nm and about 30 nm, between about 50 nm and about 30 nm or between about 30 nm and about 10 nm, in the down-track direction from first notch side 70A. In a further example, second notch side 70B and third notch side 70C are less than about 100 nm, and more specifically are between about 100 nm and about 5 nm, between about 100 nm and about 30 nm, between about 50 nm and about 30 nm or between about 30 nm and about 10 nm, in the cross-track direction from first and second sides 58A, 58B, respectively, of NFT 58.

The size of notch 70 can be varied. Notch 70 has a width defined between second notch side 70B and third notch side 70C; and notch 70 has a depth defined between leading edge 68L of notched write pole 68 and first notch side 70A. In one example, notch 70 has a width of about 30 nm and a depth of about 30 nm. In another example, notch 70 has a width of about 30 nm and a depth of about 50 nm. In a further example, notch 70 has a width of about 50 nm and a depth of about 50 nm. The size of notch 70 affects the distance between notched write pole 68 and NFT 58. Further, the size of notch 70 enables the size of NFT 58 to be varied.

In recording head 66A, leading edge 68L of notched write pole 68 is aligned with or is down-track of trailing edge 58T of NFT 58. In recording head 66A, NFT 58 is located in front of notch 70; NFT 58 is not located in notch 70. As shown in FIG. 7, leading edges 68L of first write pole side 72A and second write pole side 72B of notched write pole 68 are about equal to or aligned with trailing edge 58T of NFT 58.

Figure 8:
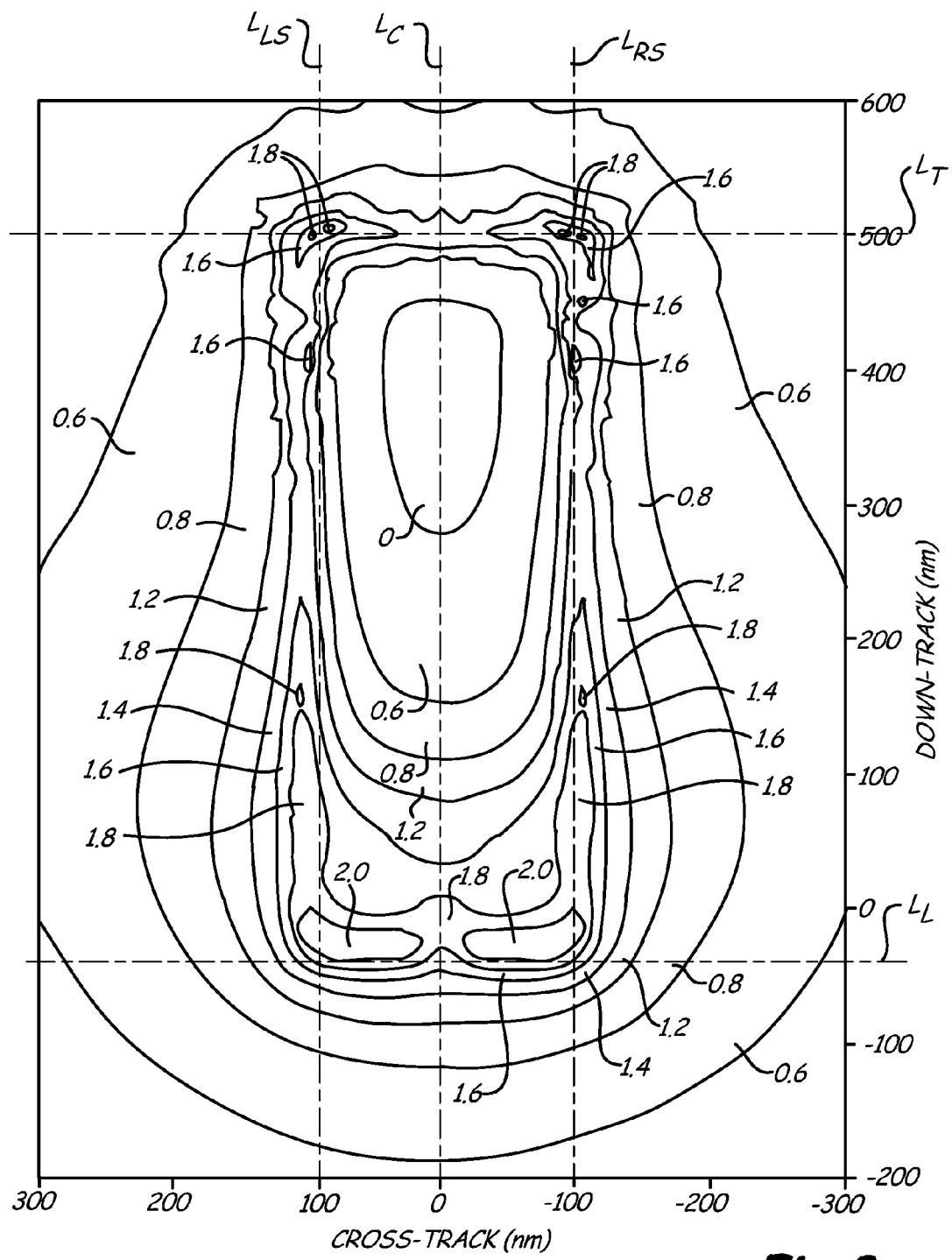
FIG. 8 illustrates the Stoner-Walfarth effective magnetic field profile for the notched recording head of FIG. 7 at about 60 milliamps electric current and a head-to-media spacing of about 7.5 nanometers.

First write pole side 72A and second write pole side 72B alter the magnetic field of notched write pole 68. FIG. 8 shows a simulated Stoner-Walfarth effective magnetic field profile for notched write pole 68 at about 60 milliamps electric current, a head-to-media spacing (HMS) of about 7.5 nanometers, and with notch 70 having a depth of about 30 nm and a width of about 30 nm. In FIG. 8, the X-axis is the cross-track position, the Y-axis is the down-track position, and the Stoner-Walfarth effective magnetic fields of various locations are labeled in Tesla. Leading edges 68L of first and second sides 72A, 72B of notched write pole 68 are located approximately along line $L_L$ between line $L_{LS}$ and line $L_{RS}$. Trailing edge 68T of notched write pole 68 is located in the positive down-track direction from line $L_L$, approximately along line $L_T$ between line $L_{LS}$ and line $L_{RS}$. NFT 58, which is not shown in FIG. 8, is located in the negative down-track direction from line $L_L$. Centerline $L_C$ illustrates the cross-track center of notched write pole 68. Along line $L_L$, the Stoner-Walfarth effective magnetic field of notched write pole 68 is less at centerline $L_C$ than at the sides, such as at line $L_{LS}$ or line $L_{RS}$, because of notch 70, first write pole side 72A and second write pole side 72B.

Comparing FIG. 4 with FIG. 8 illustrates that notch 70 reshapes the field profile of the recording head. In FIG. 4, the field profile of recording head 40 was about constant along the length of leading edge 40L. In contrast, the field profile of recording head 66A along leading edge 66L is higher at the sides than at the center.

Notch 70, first write pole side 72A and second write pole side 72B do not significantly alter the thermal profile of NFT 58 from that shown in FIG. 5. In recording head 66A, the temperature of magnetic media 16 is highest along centerline $L_C$ and decreases or decays in either cross-track direction. Thus, at leading edge 68L, notched write pole 68 has a higher field at the sides where the temperature of magnetic media 16 is lower, and leading edge 68L has a lower field at the center where the temperature of magnetic media 16 is higher.

As described above, NFT 58 heats a portion of media 16 to reduce its coercivity so that notched recording head 66A can write to magnetic media 16. The higher the temperature of magnetic media 16, the lower the coercivity of magnetic media 16 and the easier it is to write to magnetic media 16 (i.e. less magnetic flux is required to write to magnetic media 16). Recording head 66A has an increased magnetic field at the sides of the written tracks due to write pole sides 72A and 72B. This enables head 66A to write to media 16 at the sides of the tracks which have a higher coercivity due to the reduced temperature of media 16 at these locations. Further, recording head 66A has a reduced magnetic field at the center of leading edge 68L where the temperature of media 16 is higher. At this location, magnetic media 16 has a lower coercivity due to the increased temperature, and less magnetic field is necessary to write to media 16. Increasing the magnetic field where more magnetic field is necessary to change the polarity of media 16 because media 16 has lower temperature and a higher coercivity, and decreasing the magnetic field where less magnetic field is necessary to change the polarity of media 16 because media 16 has a higher temperature and a lower coercivity produces a magnetic transition that has less curvature.

Figure 9:
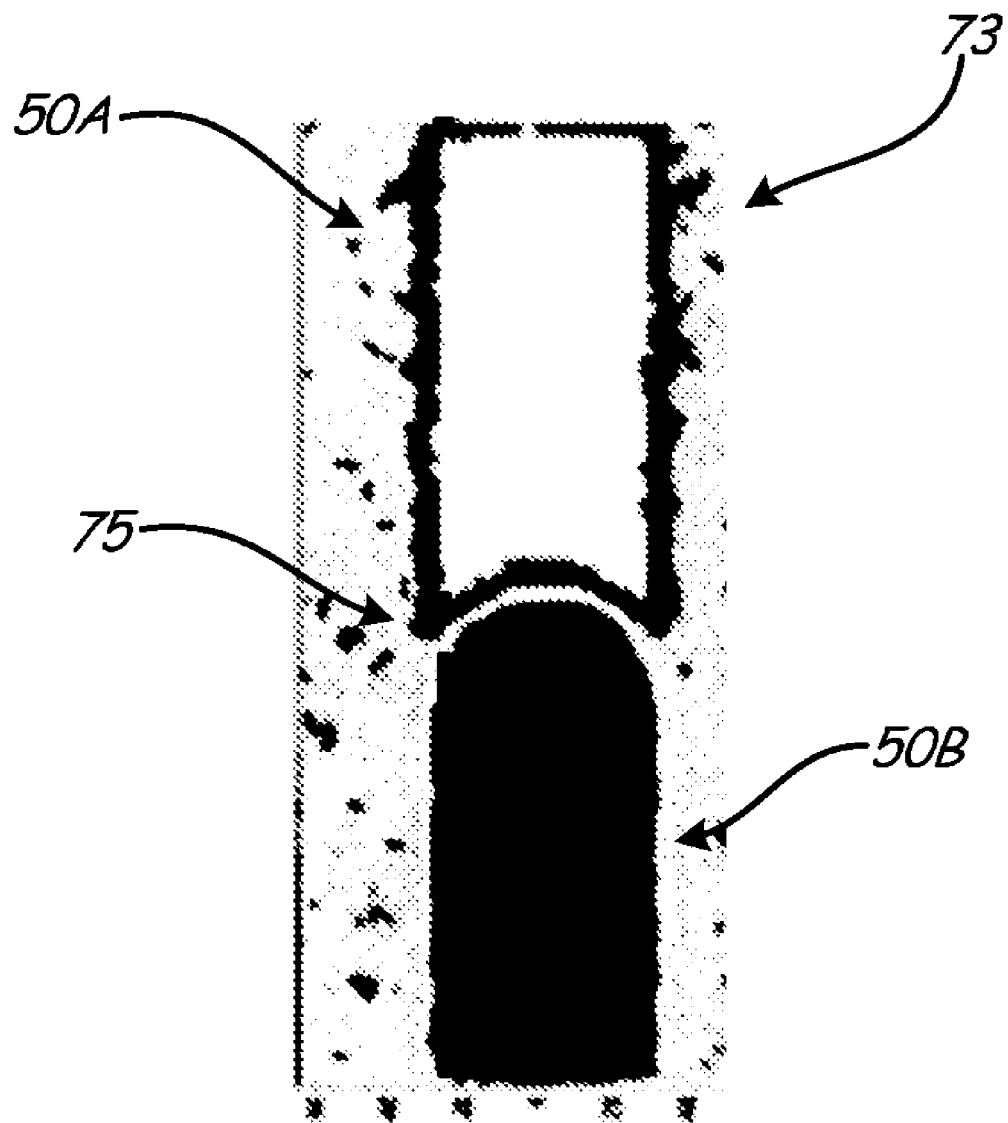
FIG. 9 is a simulated magnetization image illustrating a magnetic transition formed on a magnetic media by the notched recording head of FIG. 7.

FIG. 9 is a simulated magnetization image illustrating the magnetic transition curvature formed on magnetic media 16 by notched recording head 66A. FIG. 9 shows bit 73 represented by a single magnetic transition, and written by recording head 66A having notched write pole 68 and NFT 58 with width W of about 30 nm. Bit 73 includes positive portion 50A, negative portion 50B and magnetic transition 75, which is formed between positive portion 50A and negative portion 50B.

Magnetic transition 75 of FIG. 9 has a reduced transition curvature compared to magnetic transition 65 of FIG. 6. As described above, transition curvature is affected by the thermal profile and the field profile. By having a higher magnetic field on the sides of leading edge 68L where the magnetic media has a lower temperature and a lower magnetic field at the center of leading edge 68L where magnetic media 16 has a higher temperature, magnetic transition 75 has a reduced transition curvature. The improved transition curvature allows more bits to be written on the media and increases the areal density. Alternatively, the improved transition curvature improves the signal-to-noise ratio (SNR) and the bit error rate (BER).

FIGS. 10A-15B illustrate a method for forming recording head 66A of FIG. 7. FIGS. 10A-15A are cross-sectional views. FIGS. 10B-15B are views of FIGS. 10A-15A, respectively, taken along line 76, which will become air bearing surface (ABS) 56 during the final stages of fabrication.

Beginning with FIGS. 10A and 10B, waveguide core 60 is formed on bottom cladding 78, insulating layer 64 is deposited on waveguide core 60, and NFT 58 is formed on insulating layer 64. Bottom cladding 78 is a low refractive index dielectric material and waveguide core 60 is a high refractive index dielectric material. Insulating layer 64 is a conformal low refractive index material such as aluminum oxide. NFT 58 can be a metal such as gold, copper or silver. NFT 58 can be formed by a known lift-off process. When viewed from line 76, NFT 58 has a smaller width than insulating layer 64, waveguide core 60 and bottom cladding 78. As discussed above, the width of NFT 58 defines the width of the tracks written. Example widths of NFT 58 range between approximately 10 nm and approximately 100 nm.

Next, as shown in FIGS. 11A and 11B, insulating layer 64 is deposited over NFT 58. Insulating layer 64 includes a conformal, low refractive index material, such as aluminum oxide. In one example, insulating layer 64 is deposited by an atomic layer deposition process. Atomic layer deposition is a self-limiting thin film deposition technique which is based on a sequential use of a gas phase chemical process. Insulating layer 64 is a thin insulating layer. The thickness of insulating layer 64 can be varied to change the distance between NFT 58 and notched write pole 68. In one example, insulating layer 64 is between about 5 nm and about 50 nm thick.

Next, as shown in FIGS. 12A and 12B, write pole notched portion 80 is formed on insulating layer 64. Write pole notched portion 80 forms notched write pole sides 72A, 72B. Write pole notched portion 80 includes a suitable magnetic write pole material, such as an alloy comprising cobalt, iron or nickel or combinations thereof. A lift-off process can be used to form write pole notched portion 80. Insulating layer 64 insulates NFT 58 from write pole notched portion 80 and maintains the efficiency of NFT 58. The thickness of insulating layer 64 deposited on NFT 58 determines the distance between NFT 58 and write pole notched portion 80. Increasing the thickness of insulating layer 64 increases the distance between NFT 58 and write pole notched portion 80.

Next, in FIGS. 13A and 13B, insulating layer 64 is deposited over write pole notched portion 80 and the previously deposited insulating layer 64. Insulating layer 64 includes a conformal, low refractive index material, such as aluminum oxide. Insulating layer 64 deposited in this step can have the same composition or a different composition than the previously deposited insulating layers 64.

Next, as shown in FIGS. 14A and 14B, insulating layer 64, write pole notched portion 80, NFT 58 and waveguide core 60 are etched to form sloped surface S. Finally, in FIGS. 15A and 15B, a magnetic write pole material is deposited on sloped surface S to form notched write pole 68 having notch 70 and first and second notch sides 72A and 72B. The write pole material can be the same or different than write pole notched portion 80. In one example, the write pole material is an alloy containing iron, cobalt, or nickel or combinations thereof. Any known deposition method can be used to deposit the write pole material. In one example, electrodeposition is used. In a further processing step, the recording head is cut or milled along line 76 to form air bearing surface 56. The method described above and illustrated in FIGS. 10A-15B illustrates one possible process for forming recording head 66A having a notched write pole. One skilled in the art will recognize that there are other viable processes that achieve the same design.

In FIGS. 7-15B, NFT 58 is located in front and outside of notch 70. However, NFT 58 can also be positioned at least partially within notch 70. In an alternative embodiment shown in FIG. 16, NFT 58 is partially located in notch 70 of notched write pole 68. FIG. 16 is an end view of notched recording head 66B as viewed from magnetic media 16. Notched recording head 66B is similar to notched recording head 66A of FIG. 7 and includes notched write pole 68, NFT 58 and waveguide core 60. Notched write pole 68, NFT 58 and waveguide core 60 function as described above. In notched recording head 66B, NFT 58 is partially located in notch 70. Trailing edge 58T of NFT 58 is down-track from leading edge 68L of notched write pole 68 such that a portion of NFT 58 is positioned within notch 70.

Notched write pole 68 is not in contact with NFT 58. Notched write pole 68 and NFT 58 are spaced apart and insulated from one another by an insulating material, such as aluminum oxide, to maintain the efficiency of NFT 58. As described above, notched write pole 68 will absorb a portion of the light from NFT 58 if notched write pole 68 and NFT 58 are not insulated from one another. In one example, NFT 58 and notched write pole 68 are about 10 nm to about 30 nm apart on all sides. The distance between leading edge 58L of NFT 58 and leading edge 68L of notched write pole 68 can be varied so that the degree to which NFT 58 is located within notch 70 is varied.

Figure 17:
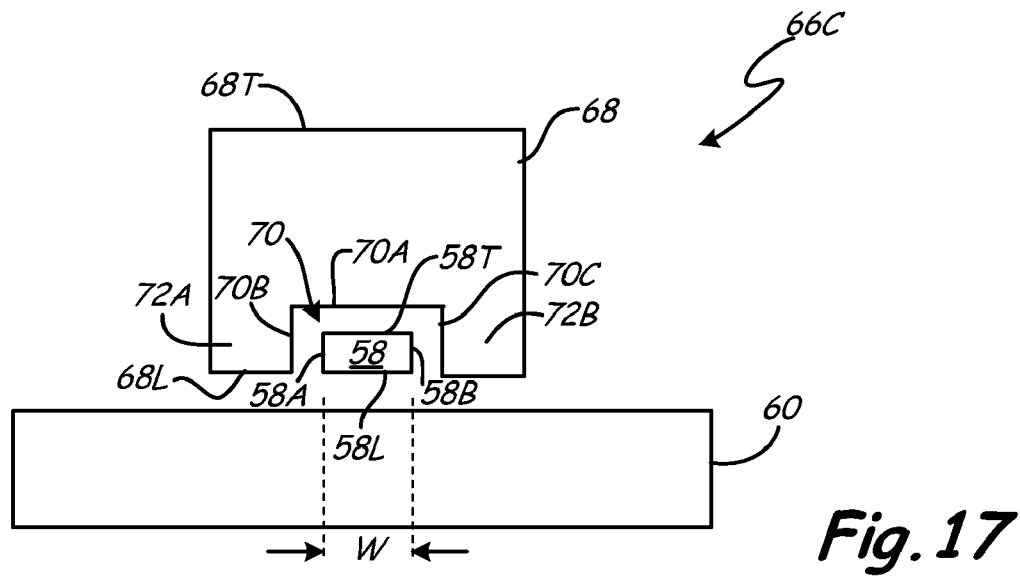
FIG. 17 is an end view of another alternative embodiment of a notched recording head for HAMR as viewed from a magnetic media.

In a further alternative embodiment shown in FIG. 17, NFT 58 is completely located in notch 70 of notched write pole 68. FIG. 17 is an end view of notched recording head 66C as viewed from magnetic media 16. Notched recording head 66C is similar to recording heads 66A and 66B, and includes notched write pole 68, NFT 58 and waveguide core 60. Notched write pole 68, NFT 58 and waveguide core 60 function as described above. In notched recording head 66C, NFT 58 is entirely located within notch 70 so that the leading edge write pole 68 is equal or aligned with the leading edge of NFT 58.

Although NFT 58 is located within notch 70, NFT 58 is not in contact with notched write pole 68. Notched write pole 68 and NFT 58 are spaced apart and insulated from one another by an insulating material, such as aluminum oxide. Insulating notched write pole 68 from NFT 58 prevents notched write pole 68 from absorbing light from NFT 58. In one example, NFT 58 and notched write pole 68 are less than about 100 nm apart on all sides, and more specifically are between about 100 nm and about 5 nm, between about 100 nm and about 30 nm, between about 50 nm and about 30 nm or between about 30 nm and about 10 nm apart on all sides. In another example, first notch side 70A is less than about 100 nm, and more specifically is between about 100 nm and about 5 nm, between about 100 nm and about 30 nm, between about 50 nm and about 30 nm or between about 30 nm and about 10 nm, in the down-track direction from trailing edge 58T of NFT 58. In a further example, second notch side 70B and third notch side 70C are less than 100 nm, and more specifically are between about 100 nm and about 5 nm, between about 100 nm and about 30 nm, between about 50 nm and about 30 nm or between about 30 nm and about 10 nm, in the cross-track direction from the first and second sides 58A, 58B, respectively, of NFT 58.

Notched write pole 68 allows write pole 68 to be moved closer to NFT 58 while maintaining an effective distance between notched write pole 68 and NFT 58 so that the efficiency of NFT 58 is maintained. Moving notched write pole 68 closer to NFT 58 aligns or improves the alignment of the thermal profile and the field profile. When the effective magnetic field and the temperature of magnetic media 16 are plotted versus down-track position, the slope of the magnetic field is generally opposite the slope of the temperature curve. This results in a lower effective overall gradient. Positioning notched write pole 68 closer to NFT 58 shifts the magnetic field curve so that the magnetic field curve and the temperature curve are better aligned. This results in a higher effective overall gradient and sharper magnetic transitions, which increases linear densities and increases the areal density capability.

Notched write pole 68 also produces magnetic transitions on magnetic media 16 having reduced transition curvature. Notch 70, and first and second write pole sides 72A result in a higher magnetic field at the sides of leading edge 68L than at the center of leading edge 68L of notched write pole 68. In comparison, NFT 58 produces an oval or circular-shaped thermal profile on media 16 so that the temperature of media 16 is higher at the center of leading edge 68L of notched write pole 68 than at the sides. Both the magnetic field and the thermal profile affect the transition curvature of the transition written to magnetic media 16. By producing a lower magnetic field where the temperature of magnetic media 16 is higher and a higher magnetic field where the temperature of magnetic media 16 is lower, notched write pole 68 forms magnetic transitions on magnetic media 16 that are flatter or have less transition curvature.

Figure 18:
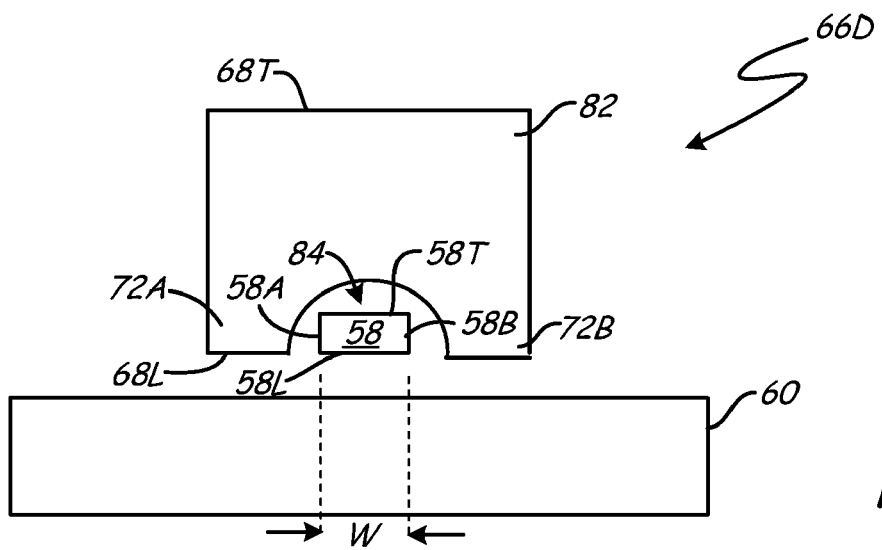
FIG. 18 is an end view of a further alternative embodiment of a notched recording head for HAMR as viewed from a magnetic media.

Although notched write pole 68 of notched recoding heads 66A-66C have a rectangular-shaped notch 70, the notch can also be concave or arcuate-shaped as shown in notched recording head 66D of FIG. 18. Notched recording head 66D includes arcuate notched write pole 82, NFT 58 and waveguide core 60. Arcuate notched write pole 82, NFT 58 and waveguide core 60 function as described above.

Arcuate notched write pole 82 is similar to notched write pole 68 described above. Arcuate notched write pole 82 shifts the field profile to better align the field profile and the thermal profile, and produces magnetic transitions on magnetic media 16 having reduced transition curvature. The arcuate shape of arcuate notch 84 enables the cross-track center of write pole 82 to be spaced further away from NFT 58 while maintaining the same distance between first write pole side 72A and first side 58A of NFT 58 and between second write pole side 72B and second side 58B of NFT 58. In one example, first and second sides 58A, 58B are about 100 nm or less, or more specifically are between about 100 nm and about 5 nm, between about 100 nm and about 30 nm, between about 50 nm and about 30 nm or between about 30 nm and about 10 nm, from first write pole side 72A and second write pole side 72B, respectively. Due to its configuration, arcuate notched write pole 82 has a further reduced field at the cross-track center of the pole, where the temperature of magnetic media 16 is the highest. Arculate notched write pole 82 results in magnetic transitions that have even less transition curvature.

While the invention has been described with reference to an exemplary embodiment(s), it will be understood by those skilled in the art that various changes may be made and equivalents may be substituted for elements thereof without departing from the scope of the invention. For example, although magnetic media 16 has been described as having tracks 14, magnetic media 16 can be bit-patterned media in which information is written to precise islands of magnetic material patterned on magnetic media 14. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic writer comprising:
   a write pole having a leading edge, a trailing edge and a notch at the leading edge; and
   a near field transducer for producing near field radiation positioned in front of or at least partially within the notch.

2. The magnetic writer of claim 1, wherein the notch forms an indention in the write pole.

3. The magnetic writer of claim 1, wherein the notch has a rectangular shape.

4. The magnetic writer of claim 1, wherein the notch has an arcuate shape.

5. The magnetic writer of claim 1, wherein the near field transducer is positioned in front of the notch.

6. The magnetic writer of claim 1, wherein at least a portion of the near field transducer is positioned within the notch.

7. The magnetic writer of claim 1, wherein the entire near field transducer is positioned within the notch.

8. The magnetic writer of claim 1, wherein the notch is between about 30 nanometers and about 50 nanometers wide.

9. The magnetic writer of claim 1, wherein the notch is between about 30 nanometers and about 50 nanometers deep.

10. The magnetic writer of claim 1, wherein a trailing edge of the near field transducer is between about 100 nanometers and about 5 nanometers from the write pole.

11. A recording head comprising:
    a write pole having a leading edge and a trailing edge relative to movement of a storage media, a first write pole side having a leading edge, a second write pole side having a leading edge and a notch at the leading edge of the write pole and positioned between the first write pole side and the second write pole side; and
    a near field transducer for heating the storage media so that the write pole can write information to the storage media, the near field transducer having a leading edge and a trailing edge relative to the movement of the storage media and aligned in a cross-track direction with the notch.

12. The recording head of claim 11, wherein the notch has straight edges.

13. The recording head of claim 11, wherein the notch has an arculate shape.

14. The recording head of claim 11, wherein the notch is an indention in the write pole.

15. The recording head of claim 11, wherein the leading edge of the first write pole side is aligned with or is down-track of the trailing edge of the near field transducer.

16. The recording head of claim 11, wherein the trailing edge of the near field transducer is down-track of the leading edge of the first write pole side.

17. The recording head of claim 11, wherein the leading edge of the near field transducer is aligned with or is down-track of the leading edge of the first write pole side.

18. The recording head of claim 11, wherein the notch is between about 30 and about 50 nanometers wide.

19. The recording head of claim 11, wherein the notch is between about 30 and about 50 nanometers deep.

20. The recording head of claim 11, wherein the trailing edge of the near field transducer is between about 100 nanometers and about 5 nanometers from the write pole.

* * * * *